United States Patent
Furukawa

(10) Patent No.: US 6,628,582 B2
(45) Date of Patent: Sep. 30, 2003

(54) OPTICAL INFORMATION REPRODUCTION APPARATUS

(75) Inventor: Junichi Furukawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 447 days.

(21) Appl. No.: 09/756,284

(22) Filed: Jan. 9, 2001

(65) Prior Publication Data

US 2001/0028614 A1 Oct. 11, 2001

(30) Foreign Application Priority Data

Feb. 7, 2000 (JP) ........................................ 2000-029002

(51) Int. Cl.[7] ................................................. G11B 7/00
(52) U.S. Cl. ................................ 369/44.32; 369/112.02
(58) Field of Search ........................... 369/44.32, 44.25, 369/44.29, 53.19, 53.31, 53.35, 44.26, 112.02, 44.23

(56) References Cited

U.S. PATENT DOCUMENTS 6,125,088 A * 9/2000 Ogasawara ............... 369/44.32
6,137,754 A * 10/2000 Furukawa et al. ........ 369/44.32
6,212,141 B1 * 4/2001 Tanikawa ................. 369/53.37
6,295,256 B1 * 9/2001 Kimikawa et al. ....... 369/44.32
6,510,111 B2 * 1/2003 Matsuura ................. 369/44.32
6,552,984 B1 * 4/2003 Yamazaki et al. ........ 369/44.32

* cited by examiner

Primary Examiner—Thang V. Tran
(74) Attorney, Agent, or Firm—Sughrue Mion, PLLC

(57) ABSTRACT

An optical information reproduction apparatus is provided that, even when spherical aberration has occurred because of a thickness error in a transmissive substrate of an optical disk, is capable of improving the information reading accuracy by correcting the spherical aberration. The spherical aberration of an optical system is corrected while changing the amount of correction in a state where an objective lens is retained at a position on a focus adjusting orbit where the amplitude level of a reading signal read from an optical recording medium reaches a maximum. The spherical aberration is then corrected by using the amount of correction, which is defined as the final amount of spherical aberration correction, where the amplitude level of a tracking error signal obtained during this time reaches the maximum.

9 Claims, 5 Drawing Sheets

OPTICAL INFORMATION REPRODUCTION APPARATUS

BACKGROUND OF THE INVENTION

1. Field of the Invention

The present invention relates to an optical information reproduction apparatus for reproducing recorded information from an optical recording medium.

2. Description of Related Art

In order to protect its recording surface, an optical disk used as an optical recording medium is provided with, a transmissive substrate with a predetermined thickness in such a way as to cover the recording surface. An optical pickup used as an information reading means reads recorded information from the optical disk in accordance with the amount of reflected light when a reading beam of light is irradiated onto the recording surface through the transmissive substrate.

However, in manufacturing, it is difficult to form the transmissive substrates of all optical disks with a prescribed thickness. Usually, a thickness error of several tens of micrometers occurs. Therefore, the thickness error of the transmissive substrates produces spherical aberration. The production of the spherical aberration sometimes lowers markedly the amplitude level of an information reading signal or a tracking error signal, and, disadvantageously, it lowers information reading accuracy.

OBJECT AND SUMMARY OF THE INVENTION

The present invention has been made to solve the problem, and an object of the present invention is to provide an optical information reproduction apparatus capable of improving information reading accuracy by correcting spherical aberration even if the spherical aberration is produced by a thickness error of the transmissive substrate of an optical disk.

The present invention is characterized in that an optical information reproduction apparatus for reproducing recorded information from an optical recording medium comprises an optical system that includes a laser generating element for generating a laser beam, an objective lens for condensing the laser beam on a recording surface of the optical recording medium, an objective lens transfer means for transferring the objective lens on a focus adjusting orbit, and a photodetector for obtaining a photoelectric conversion signal by applying photoelectric conversion to reflected light from the optical recording medium; a means for generating a reading signal and a tracking error signal in accordance with the photoelectric conversion signal; a means for controlling the objective lens transfer means so as to transfer the objective lens on the focus adjusting orbit so that the amplitude level of the reading signal reaches a maximum and to retain the objective lens at a position at the maximum level; a spherical aberration correction means for correcting spherical aberration occurring in the optical system to an extent corresponding to the amount of correction; and a means for supplying, to the spherical aberration correction means, a final amount of spherical aberration correction where the amplitude level of the tracking error signal reaches a maximum while changing the amount of correction and detecting the amplitude level of the tracking error signal.

DETAILED DESCRIPTION OF THE PREFERRED EMBODIMENT

An embodiment of the present invention will be described in detail, hereinafter, with reference to the attached drawings.

Figure 1:
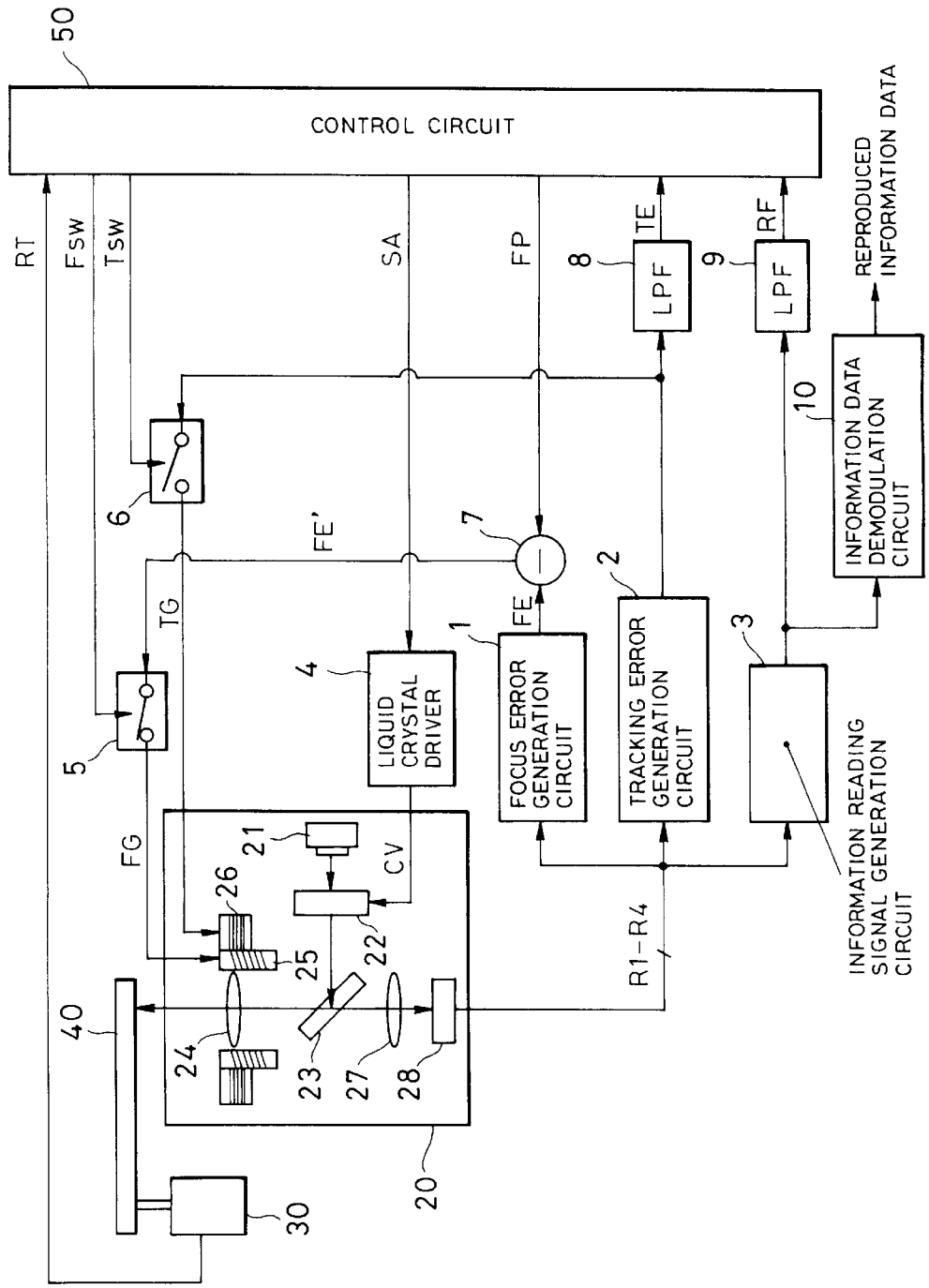
FIG. 1 is a diagram showing an optical system of the optical information reproduction apparatus according to the present invention.

FIG. 1 is a diagram showing a structure of an optical information reproduction apparatus according to the present invention. In FIG. 1, a pickup 20 irradiates a reading beam of light onto an optical disk 40 used as an optical recording medium that is rotated and driven by a spindle motor 30, and receives reflected light therefrom. At this time, the spindle motor 30 generates a rotation signal RT whenever the optical disk 40 is caused to make one rotation, and supplies the signal to a control circuit 50. The pickup 20 receives reflected light, as mentioned above, when a reading beam is irradiated onto the optical disk 40, then converts the reflected light into an electric signal, and supplies the signal to a focus error generation circuit 1, a tracking error generation circuit 2, and an information reading signal generation circuit 3.

The pickup 20 comprises a laser generating element 21, a liquid crystal panel 22, a half mirror 23, an objective lens 24, a focusing actuator 25, a tracking actuator 26, a condensing lens 27, and a photodetector 28.

The laser generating element 21 generates a laser beam that has predetermined optical power. The laser beam is transmitted through the liquid crystal panel 22, which is disposed to correct spherical aberration consequent on a thickness error of the transmissive substrate of the optical disk 40, and is guided to the half mirror 23.

Figure 2:
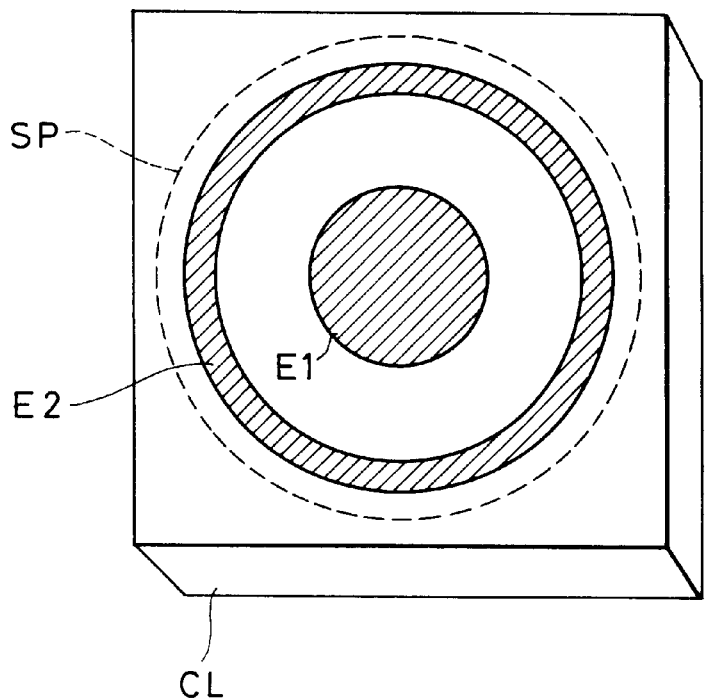
FIG. 2 is a view schematically showing the structure of a liquid crystal panel 22.

FIG. 2 is a view a structure of the liquid crystal panel 22 viewed from the optical axis direction of the laser beam.

As shown in FIG. 2, the liquid crystal panel 22 comprises a circular transparent electrode E1, an annular transparent electrode E2, and a liquid crystal layer CL filled with liquid crystal molecules that have birefringent characteristics. When the lens diameter of the objective lens 24 is 3000 [$\mu$m], the diameter of the transparent electrode E1 is about 1600[$\mu$m], for example, and the outer diameter of the transparent electrode E2 is about 2800 [$\mu$m]. Both center axes of the transparent electrodes E1 and E2 coincide with the optical axis center of the laser beam. A predetermined potential (two volts, for example) is fixedly applied to the transparent electrode E1, and a liquid crystal driving potential CV from the liquid crystal driver 4 is applied to the transparent electrode E2. In this case, the twist angle of the liquid crystal molecules existing in an annular area covered with the transparent electrode E2 among the liquid crystal molecules filled in the liquid crystal layer CL shifts by an amount that corresponds to the liquid crystal driving potential CV. Therefore, as shown in FIG. 2, when a beam spot SP by the laser beam is irradiated onto the liquid crystal panel 22, a phase difference of an amount corresponding to the liquid crystal driving potential CV is produced between light that is transmitted through the area covered with the transparent electrode E2 and light that is transmitted through the other area. In other words, the liquid crystal panel 22 performs transmission and output while providing the wave front of the laser beam supplied from the laser generating element 21 with the aforementioned phase difference. By this operation, the liquid crystal panel 22 corrects spherical aberration caused by thickness variations of the transmissive substrate of the optical disk.

The half mirror 23 guides the laser beam supplied from the liquid crystal panel 22 to the objective lens 24. The objective lens 24 condenses the laser beam, which serves as a reading beam, supplied from the half mirror 23 on a recording track formed on the recording surface of the optical disk 40. The focusing actuator 25 transfers the objective lens 24, by an amount corresponding to a focus driving signal FG supplied from a servo loop switch 5, in the direction perpendicular to the recording surface of the optical disk 40, i.e., on the focus adjusting orbit. The tracking actuator 26 transfers the optical axis of the objective lens 24, by an amount corresponding to a tracking driving signal TG supplied from a servo loop switch 6, in a disk radial direction of the optical disk 40.

At this time, reflected light that has been obtained when the reading beam is irradiated onto the recording track of the optical disk 40 is guided to the condensing lens 27 through the objective lens 24 and the half mirror 23. The condensing lens 27 condenses such reflected light and irradiates it onto the light receiving surface of the photodetector 28.

Figure 3:
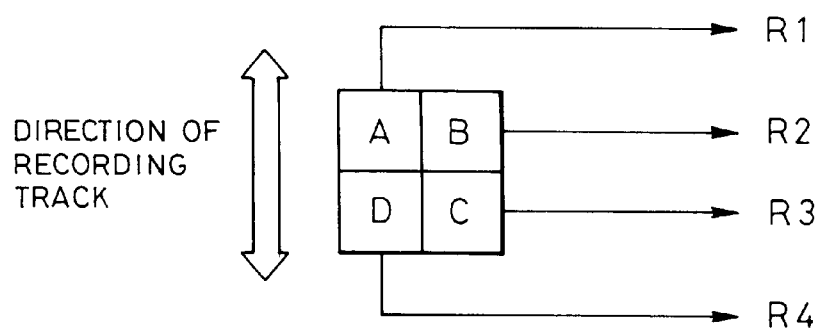
FIG. 3 is a view showing a light receiving surface of a photodetector 28.

FIG. 3 is a view showing the light receiving surface of the photodetector 28.

As shown in FIG. 3, the photodetector 28 has four independent light receiving elements A to D arranged as in the figure with respect to the direction of the recording track. Each light receiving element A to D receives reflected light supplied from the condensing lens 27, then converts it into electric signals, and outputs them as photoelectric conversion signals R1 to R4.

A focus error generation circuit 1 calculates the sum of output of the light receiving elements arranged on a diagonal line among the light receiving elements A to D in the photodetector 28 and the sum of output of the remaining light receiving elements arranged on the other diagonal line, and supplies the difference between the sums to a subtracter 7 as a focus error signal FE. That is, the focus error generation circuit 1 supplies the focus error signal FE defined as "FE=(R1+R3)−(R2+R4)" to the subtracter 7.

The subtracter 7 subtracts a focus adjusting orbit position signal FP supplied from the control circuit 50 from the focus error signal FE, and supplies a focus error signal FE' obtained by the subtraction to the servo loop switch 5. The servo loop switch 5 is brought into an On-state or OFF-state in accordance with a focus servo switch signal $F_{SW}$ supplied from the control circuit 50. For example, when a focus servo switch signal $F_{SW}$ of logical level "0" that denotes "focus servo off" is supplied, the servo loop switch 5 reaches the OFF-state. On the other hand, when a focus servo switch signal $F_{SW}$ of logical level "1" that denotes "focus servo on" is supplied, the servo loop switch 5 reaches the ON-state, and begins supplying a focus driving signal FG that corresponds to the focus error signal FE' to the focusing actuator 25. That is, a so-called focus servo loop is formed by a system that comprises the pickup 20, the focus error generation circuit 1, the subtracter 7, and the servo loop switch 5. By such a focus servo loop, the objective lens 24 is maintained at a position on the focus adjusting orbit in accordance with the focus adjusting orbit position signal FP.

A tracking error generation circuit 2 calculates the sum of output of the light receiving elements arranged diagonally among the light receiving elements A to D of the photodetector 28 and the sum of output of the remaining light receiving elements arranged diagonally, and supplies the phase difference between the output sums to the servo loop switch 6 and to an LPF (low pass filter) 8 as a tracking error signal. That is, the phase difference between (R1+R3) and (R2+R4) is calculated as the tracking error signal. The servo loop switch 6 is brought into an ON-state or an OFF state according to a tracking servo switch signal $T_{SW}$ supplied from the control circuit 50. For example, when the tracking servo switch signal $T_{SW}$ of logical level "1" that denotes "tracking servo-on" is supplied, the servo loop switch 6 reaches an On-state and begins supplying a tracking driving signal TG that corresponds to the tracking error signal to the tracking actuator 26. On the other hand, when the tracking servo switch signal $T_{SW}$ of logical level "0" that denotes "tracking servo-off" is supplied, the servo loop switch 6 reaches an OFF-state. At this time, the tracking driving signal TG is not supplied to the tracking actuator 26. The LPF 8 supplies a signal in which a high-pass noise component has been removed from the tracking error signal to the control circuit 50 as a tracking error signal TE.

The information reading signal generation circuit 3 adds the photoelectric conversion signals R1 to R4 to each other, then calculates the result of addition as an information reading signal that corresponds to information data recorded on the optical disk 40, and supplies the signal to an LPF (low pass filter) 9 and to an information data demodulation circuit 10. The LPF 9 supplies a signal, in which a high pass noise component has been removed from such information reading signal, to the control circuit 50 as an information reading signal RF. The demodulation circuit 10 reproduces the information data by applying given demodulation to such information reading signal, and then outputs it as reproduced-information data.

The control circuit 50 exercises control according to a main routine (not shown) in order to achieve various recording and reproduction operations in the optical information reproduction apparatus. At this time, when the optical disk 40 is loaded into the optical information reproduction apparatus while executing the main routine, the control circuit 50 begins executing the spherical aberration correction subroutine that consists of procedures shown in FIGS. 4 and 5.

Figure 4:
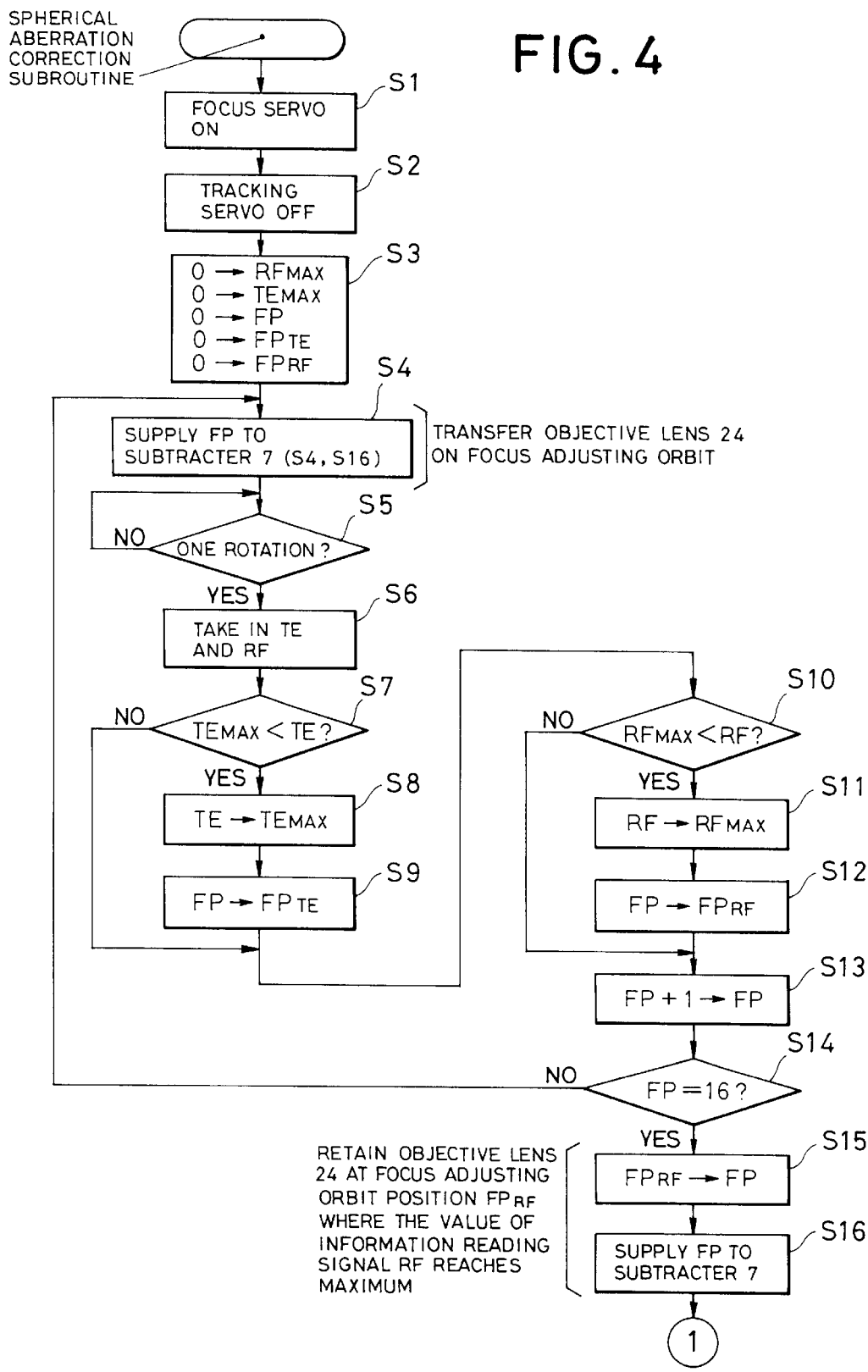
FIG. 4 is a subroutine flow chart of spherical aberration correction.

In FIG. 4, the control circuit 50 first supplies a focus servo switch signal $F_{SW}$ of logical level "1" to the servo loop switch 5 in order to bring the focus servo into an ON-state (step S1). Thereafter, the control circuit 50 supplies a tracking servo switch signal $T_{SW}$ of logical level "0" to the servo loop switch 6 in order to bring the tracking servo into an OFF-state (step S2). Thereafter, the control circuit 50 stores, in a built-in register (not shown), the digit "0" that is an initial value for each of the maximum value $RF_{MAX}$ of the amplitude level of an information reading signal RF, the maximum value $TE_{MAX}$ of the amplitude level of a tracking error signal TE, a focus adjusting orbit position signal FP, the position $FP_{TE}$ on the focus adjusting orbit when the amplitude level of the tracking error signal TE reaches a maximum, and the position $FP_{RF}$ on the focus adjusting orbit when the amplitude level of the information reading signal RF reaches a maximum (step S3).

Thereafter, the control circuit 50 supplies the focus adjusting orbit position signal FP stored in the built-in register to the subtracter 7 (step S4). The focusing actuator 25 then transfers the objective lens 24 to a position on the focus adjusting orbit indicated by the focus adjusting orbit position signal FP stored in the built-in register by execution of step S4. Thereafter, based on a rotation signal RT supplied from the spindle motor 30, the control circuit 50 repeatedly judges whether the optical disk 40 has made one rotation or not until the optical disk 40 makes one rotation (step S5). When it judges that the optical disk 40 has made one rotation in step S5, the control circuit 50 takes in the tracking error signal TE and the information reading signal RF supplied from the LPF 8 and the LPF 9, respectively (step S6).

Thereafter, the control circuit 50 judges whether or not the amplitude level of the tracking error signal TE that has been taken in is higher than the value $TE_{MAX}$ stored in the built-in register (step S7). When it judges that the amplitude level of the tracking error signal TE is higher than the value $TE_{MAX}$ in step S7, the control circuit 50 overwrites the amplitude level of the tracking error signal TE taken in step S6 onto the built-in register and stores it therein as a new value $TE_{MAX}$ (step S8). Thereafter, the control circuit 50 rewrites the value $FP_{TE}$ stored in the built-in register into a value indicated by the focus adjusting orbit position signal FP stored in the built-in register (step S9).

After execution of step S9, or when it is judged in step S7 that the amplitude level of the tracking error signal TE is not higher than the value $TE_{MAX}$, the control circuit 50 judges whether or not the amplitude level of the information reading signal RF taken in step S6 is higher than the value $RF_{MAX}$ stored in the built-in register (step S10). When it is judged in step S10 that the amplitude level of the information reading signal RF is higher than the value RF, the control circuit 50 overwrites the amplitude level of the information reading signal RF taken in step S6 onto the built-in register and stores it therein as a new value $RF_{MAX}$ (step S11). Thereafter, the control circuit 50 rewrites the value $FP_{RF}$ stored in the built-in register into a value indicated by the focus adjusting orbit position signal FP (step S12).

After execution of step S12 or when it is judged in step S10 that the amplitude level of the information reading signal RF is not higher than the value $RF_{MAX}$, the control circuit 50 overwrites a value in which "1" is added to the value of the focus adjusting orbit position signal FP stored in the built-in register onto the built-in register and stores it therein as a new value FP (step S13). Thereafter, the control circuit 50 judges whether or not the value of the focus adjusting orbit position signal FP stored in the built-in register has become "16" (step S14). When it is judged in step S14 that the value of the focus adjusting orbit position signal FP has not become "16", the control circuit 50 returns to step S4 and repeats the operations of steps S4 to S14 as mentioned above. During this time, the position on the focus adjusting orbit of the objective lens 24 changes by a given distance whenever a series of operations of steps S13, S14, and S4 are conducted. In other words, the position on the focus adjusting orbit of the objective lens 24 changes by a given distance in each of sixteen stages in which the value of the focus adjusting orbit position signal FP changes from "0" to "15". And, in each stage, the amplitude level of the tracking error signal TE and the amplitude level of the information reading signal RF are taken in by the execution of step S6. Thereafter, the position on the focus adjusting orbit of the objective lens 24, when its amplitude level reaches a maximum in the tracking error signal TE in each stage, is obtained as "$FP_{TE}$" by execution of steps S7 to S9. In addition, the position on the focus adjusting orbit of the objective lens 24, when the amplitude level reaches a maximum among the information reading signals RF in each stage, is obtained as "$FP_{RF}$" by the execution of steps S10 to S12.

On the other hand, when it is judged in step S14 that the value of the focus adjusting orbit position signal FP stored in the built-in register has become "16", the control circuit 50 rewrites the value of the focus adjusting orbit position signal FP so as to change $FP_{RF}$ stored in the built-in register into a new value of the focus adjusting orbit position signal FP (step S15). Thereafter, the control circuit 50 supplies the rewritten focus adjusting orbit position signal FP to the subtracter 7 (step S16). That is, by the execution of steps S15 and S16, the objective lens 24 is retained at the position on the focus adjusting orbit where the amplitude level of the information reading signal RF reaches the maximum, i.e., at the position indicated by the aforementioned "FPRF".

Thereafter, the control circuit 50 judges whether "$FP_{TE}$" coincides with "$FP_{RF}$" or not, which are stored in the built-in register, i.e., whether the position $FP_{TE}$ on the focus adjusting orbit where the amplitude level of the tracking error signal TE reaches the maximum coincides with the position $FP_{RF}$ on the focus adjusting orbit where the amplitude level of the information reading signal RF reaches the maximum or not (step S17).

When it is judged in step S17 that the two positions do not coincide with each other, the control circuit 50 stores "0" that is an initial value of a spherical aberration correction signal SA and "0" that is an initial value of the maximum value $SA_{MAX}$ of the spherical aberration correction signal SA in the built-in register. The control circuit 50 further resets the maximum value $TE_{MAX}$ of the amplitude level of the tracking error signal TE stored in the built-in register to "0" (step S18). Thereafter, the control circuit 50 supplies the spherical aberration correction signal SA stored in the built-in register to the liquid crystal driver 4 (step S19). By execution of step S19, the liquid crystal driver 4 generates a liquid crystal driving potential CV that has a potential corresponding to the value of the spherical aberration correction signal SA and applies it to the liquid crystal panel 22. Therefore, if a laser beam is irradiated onto the liquid crystal panel 22 at this time, a phase difference corresponding to the spherical aberration correction signal SA is caused between light that is transmitted through the area covered with the annular transparent electrode E2 shown in FIG. 2 and light that is transmitted through the other area. Thereby, the spherical aberration is corrected temporarily. Thereafter, based on a rotation signal RT supplied from the spindle motor 30, the control circuit 50 repeatedly judges whether the optical disk 40 has made one rotation or not until the optical disk 40 makes one rotation (step S20). When it is judged in step S20 that the optical disk 40 has made one rotation, the control circuit 50 takes in the tracking error signal TE supplied from the LPF 8 (step S21).

Thereafter, the control circuit 50 judges whether the amplitude level of the tracking error signal TE that has been taken in is higher than "$TE_{MAX}$" stored in the built-in register or not (step S22). When it is judged in step S22 that the amplitude level of the tracking error signal TE is higher than "$TE_{MAX}$", the control circuit 50 overwrites the amplitude level of the tracking error signal TE taken in step S21 onto the built-in register as a new "$TE_{MAX}$" and stores it therein (step S23). Thereafter, the control circuit 50 rewrites the value of "$SA_{MAX}$" stored in the built-in register into the value indicated by the spherical aberration correction signal SA stored in the built-in register (step S24).

After execution of step S24 or when it is judged in step S22 that the amplitude level of the tracking error signal TE is not higher than "$TE_{MAX}$" stored in the built-in register, the control circuit 50 overwrites a value in which "1" is added to the value of the spherical aberration correction signal SA stored in the built-in register onto the built-in register as a new "SA" and stores it therein (step S25). Thereafter, the control circuit 50 judges whether the value of the spherical aberration correction signal SA stored in the built-in register has become "16" or not (step S26). When it is judged in step S26 that the value of the spherical aberration correction signal SA has not become "16", the control circuit 50 returns to the execution of step S19 and repeats the operations of steps S19 to S26 as mentioned above. During this time, the liquid crystal panel 22 performs spherical aberration correction while renewing the amount of correction whenever a series of operations of steps S25, S26, and S19 are executed. In other words, spherical aberration is temporarily corrected while changing the value, which is the amount of correction, of the spherical aberration correction signal SA at sixteen stages from "0" to "15". By execution of steps S22 to S24, the amount of correction of the spherical aberration indicated when the amplitude level reaches the maximum is defined as $SA_{MAX}$ among the tracking error signals TE that have been taken in at each stage when the temporary correction of the spherical aberration is performed at the sixteen stages.

When it is judged in step S26 that the value of the spherical aberration correction signal SA has become "16", the control circuit 50 rewrites the value of the spherical aberration correction signal SA so as to change "$SA_{MAX}$" stored in the built-in register into a new value of the spherical aberration correction signal SA (step S27). Thereafter, the control circuit 50 supplies the spherical aberration correction signal SA to the liquid crystal driver 4 as a final spherical aberration correction signal (step S28). In other words, by execution of steps S27 and S28, the aforementioned "$SA_{MAX}$" is determined as the final amount of spherical aberration correction, and the liquid crystal panel 22 is driven so as to give a phase difference corresponding to the final amount of correction to the area covered with the transparent electrode E2 shown in FIG. 2. The spherical aberration is finally corrected by this driving.

After completion of step S28 or when it is judged in step S17 that "$FP_{TE}$" and "$FP_{RF}$" coincide with each other, the control circuit 50 exits the subroutine of spherical aberration correction and returns to the execution of the main routine.

A description will be made hereinafter of the principle of the spherical aberration correction by the execution of the spherical aberration correction subroutine.

Figure 6:
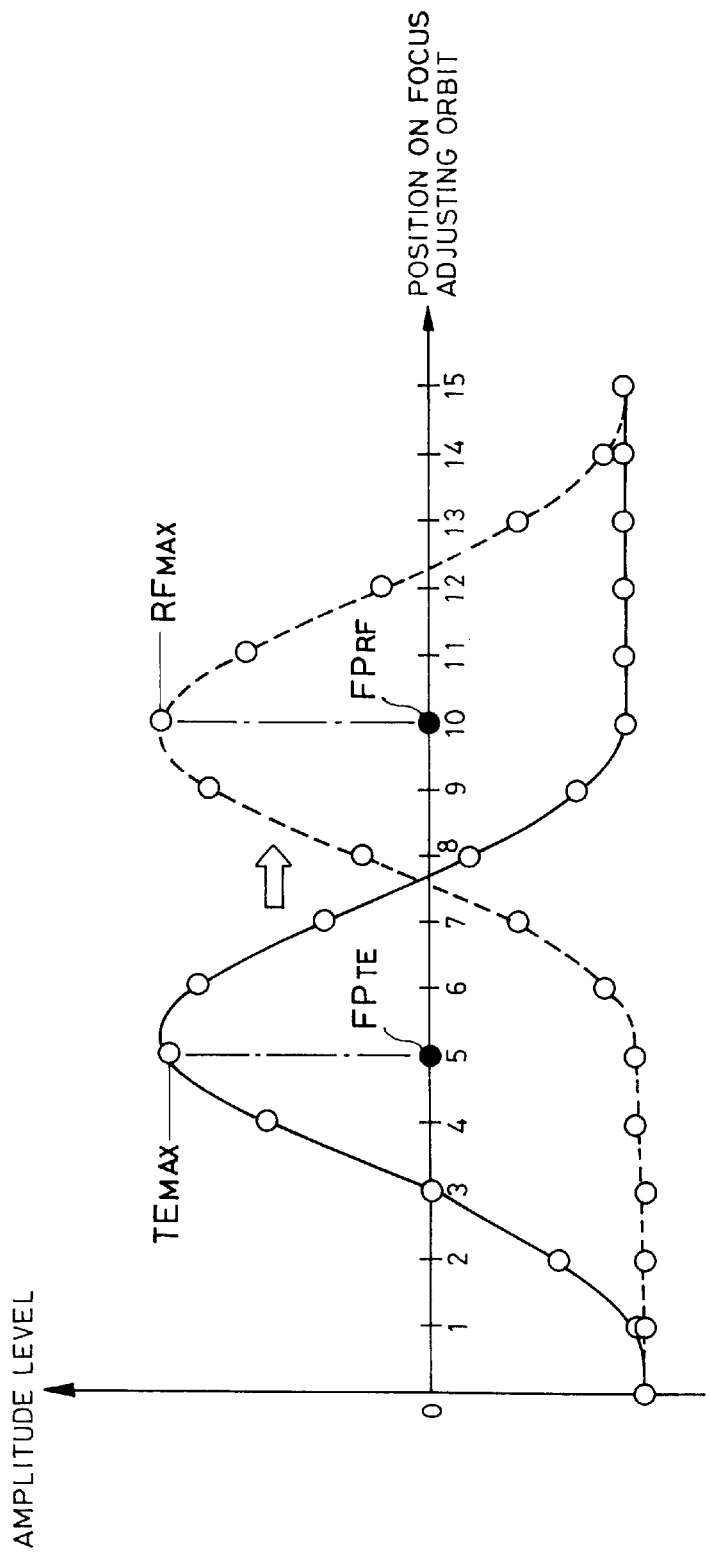
FIG. 6 is a diagram showing an example of the amplitude level of a tracking error signal and the amplitude level of an information reading signal at each position on a focus adjusting orbit that are obtained when spherical aberration is occurring.

If spherical aberration is occurring, positional discordance is caused, as shown in FIG. 6, between the position on the focus adjusting orbit where the amplitude level of the tracking error signal reaches the maximum and the position on the focus adjusting orbit where the amplitude level of the information reading signal RF reaches the maximum.

Therefore, by the execution of steps S4 to S14, the amplitude level of the tracking error signal (shown by the solid line) and the amplitude level of the information reading signal (shown by the broken line) are first obtained while changing the position of the objective lens 24 on the focus adjusting orbit from "0" to "15" as shown in FIG. 6. Thereafter, retrieval is carried out with respect to the position $FP_{TE}$ on the focus adjusting orbit where the amplitude level of the tracking error signal reaches the maximum and the position $FP_{RF}$ on the focus adjusting orbit where the amplitude level of the information reading signal reaches the maximum. At this time, by execution of steps S15 and S16, the position on the focus adjusting orbit of the objective lens 24 is retained at the position $FP_{RF}$ on the focus adjusting orbit where the amplitude level of the information reading signal reaches the maximum. In this situation, when it is judged in step S17 that the positions "$FP_{TE}$" and "$FP_{RF}$" coincide with each other, it is determined that spherical aberration is not occurring, and the spherical aberration correction subroutine is ended. On the other hand, when it is judged that the positions "$FP_{TE}$" and "$FP_{RF}$" do not coincide with each other, as shown in FIG. 6, it is determined that spherical aberration is occurring, and steps S18 to S28 are executed. In such steps S18 to S28, the spherical aberration is corrected such that the amount of correction is gradually changed by the use of the liquid crystal panel 22, and a selection is made of the amount ($SA_{MAX}$) of correction by which the amplitude level of a tracking error signal, among tracking error signals that have been taken in during this time, reaches the maximum. Based on this amount ($SA_{MAX}$), the final correction of the spherical aberration is carried out. According to this spherical aberration correction, the parabola of the tracking error signal with respect to the position on the focus adjusting orbit approaches the parabola of the information reading signal as shown by the arrow in FIG. 6. Therefore, as mentioned above, the amplitude level of the tracking error signal obtained when the position on the focus adjusting orbit of the objective lens 24 is retained at "$FP_{RF}$" is increased as mentioned above.

Figure 5:
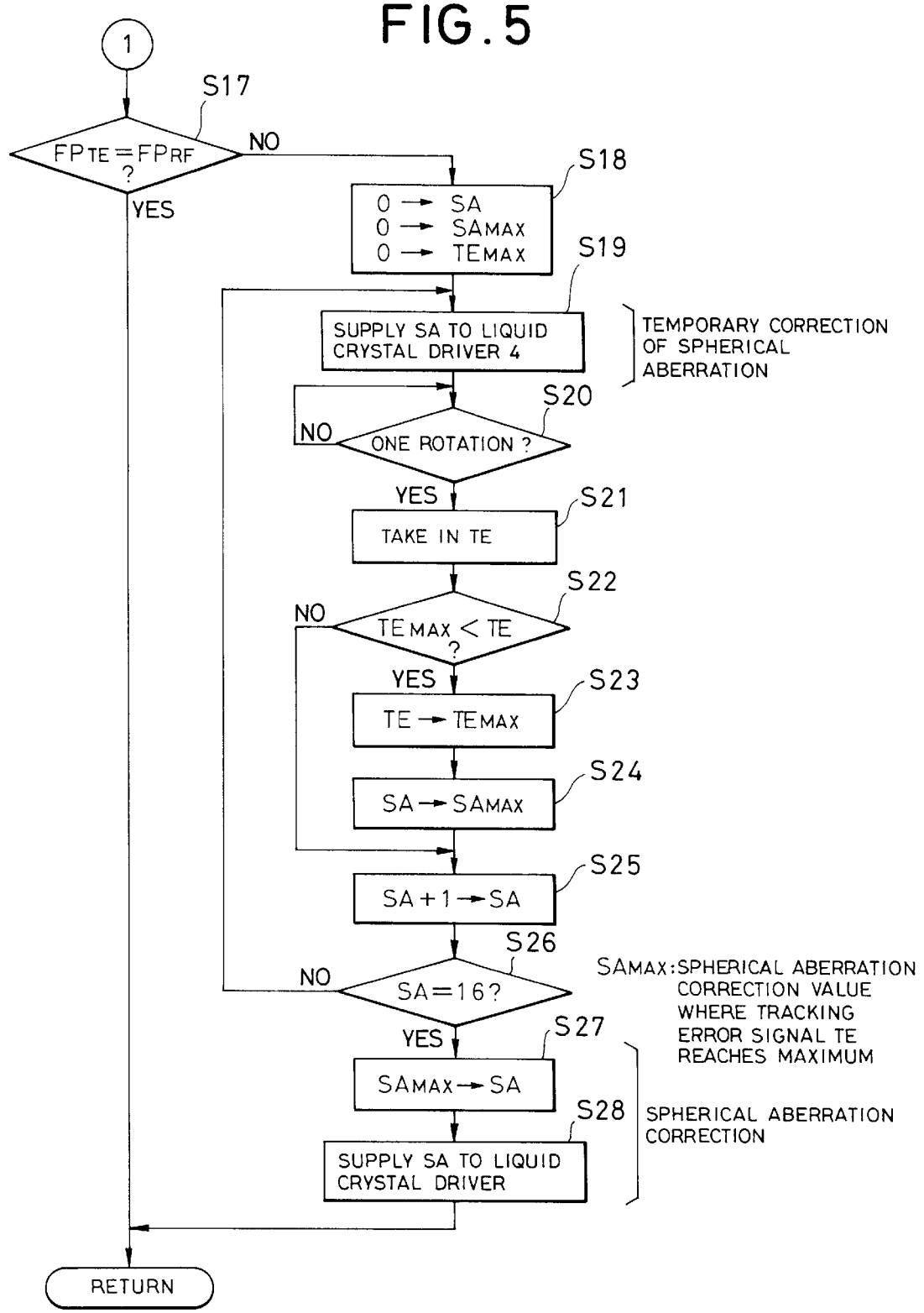
FIG. 5 is a subroutine flow chart of spherical aberration correction.

The focus adjusting orbit position signal FP and the spherical aberration correction signal SA are both adjusted at sixteen stages from "0" to "15" in the operations shown in FIG. 4 and FIG. 5. However, the number of adjustment stages is not limited to 16 stages.

Additionally, the various processes mentioned above are carried out by the use of the amplitude level of the tracking error signal in the above embodiment. But, the servo gain of a tracking servo may be used instead of the amplitude level of the tracking error signal. Additionally, instead of the information reading signal RF, a so-called focus addition signal that is obtained by adding the photoelectric conversion signals R1 to R4 to each other and extracting low pass components thereof may be used to carry out the various processes as mentioned above.

Additionally, in the above embodiment, the spherical aberration is corrected according to steps S18 to S28 in a state where the objective lens 24 is retained at the position FPRF on the focus adjusting orbit where the amplitude level of the information reading signal RF reaches the maximum by execution of steps S15 and S16.

However, the position on the focus adjusting orbit where the objective lens 24 is to be retained may be replaced by position $FP_{TE}$ on the focus adjusting orbit where the amplitude level of the tracking error signal reaches the maximum. In this spherical aberration correction, the spherical aberration is corrected such that the amount of correction is gradually changed by the use of the liquid crystal panel 22, and, based on the amount ($SA_{MAX}$) of correction by which the amplitude level of an information reading signal, among information reading signals RF that have been taken in during this time, reaches the maximum, the final correction of the spherical aberration is carried out.

Additionally, in FIG. 2, the annular transparent electrode E2 formed on the liquid crystal layer CL of the liquid crystal panel 22 is only one in number. But, a plurality of annular transparent electrodes may be concentrically formed thereon. That is, since the degree of the spherical aberration differs between the outer circumferential area and the inner circumferential area of a beam spot, a phase difference corresponding to that degree is given to each area, whereby the spherical aberration can be corrected more finely. In this case, the potential that is to be applied to each of these annular transparent electrodes is weighted according to the pattern of the spherical aberration.

As described above, according to the optical information reproduction apparatus according to the present invention, both the amplitude level of a tracking error signal and that of an information reading signal are capable of being heightened in spite of the fact that spherical aberration is occurring due to the thickness error of the transmissive substrate of an optical disk, and thus the reading accuracy of information is improved.

What is claimed is:

1. An optical information reproduction apparatus for reproducing recorded information from an optical recording medium, comprising:

an optical system, said optical system including:

a laser generating element for generating a laser beam, an objective lens for condensing the laser beam on a recording surface of the optical recording medium, an objective lens transfer means for transferring said objective lens on a focus adjusting orbit, and a photodetector for obtaining a photoelectric conversion signal by applying photoelectric conversion to reflected light from the optical recording medium, a means for generating a reading signal and a tracking error signal, respectively, in accordance with the photoelectric conversion signal, a means for controlling said objective lens transfer means so as to transfer said objective lens on the focus adjusting orbit so that an amplitude level of the reading signal reaches a maximum and to retain said objective lens at a position at the maximum level, a spherical aberration correction means for correcting spherical aberration occurring in said optical system to an extent corresponding to the amount of correction, and a means for supplying the amount of correction where an amplitude level of the tracking error signal reaches a maximum to said spherical aberration correction means as a final amount of spherical aberration correction while changing the amount of correction and detecting the amplitude level of the tracking error signal.

2. The optical information reproduction apparatus as set forth in claim 1, wherein said spherical aberration correction means comprises:

a liquid crystal panel provided with an annular transparent electrode formed on a liquid crystal layer filled with liquid crystal that has birefringent characteristics, and a liquid crystal driving circuit for applying a potential that corresponds to the amount of correction to the transparent electrode.

3. The optical information reproduction apparatus as set forth in claim 2, wherein said liquid crystal panel is disposed between said laser generating element and said objective lens in said optical system.

4. An optical information reproduction apparatus for reproducing recorded information from an optical recording medium, comprising:

an optical system, said optical system including:

a laser generating element for generating a laser beam, an objective lens for condensing the laser beam on a recording surface of the optical recording medium, objective lens transfer means for transferring said objective lens on a focus adjusting orbit, and a photodetector for obtaining a photoelectric conversion signal by applying photoelectric conversion to reflected light from the optical recording medium, a means for generating a reading signal and a tracking error signal, respectively, in accordance with the photoelectric conversion signal, a means for controlling said objective lens transfer means so as to transfer said objective lens on the focus adjusting orbit so that an amplitude level of the tracking error signal reaches a maximum and to retain said objective lens at a position at the maximum level, a spherical aberration correction means for correcting spherical aberration occurring in said optical system to an extent corresponding to an amount of correction, and a means for supplying the amount of correction where an amplitude level of the reading signal reaches a maximum to said spherical aberration correction means as a final amount of spherical aberration correction while changing the amount of correction and detecting the amplitude level of the reading signal.

5. The optical information reproduction apparatus as set forth in claim 4, wherein said spherical aberration correction means comprises:

a liquid crystal panel provided with an annular transparent electrode formed on a liquid crystal layer filled with liquid crystal that has birefringent characteristics, and a liquid crystal driving circuit for applying a potential that corresponds to the amount of correction to the transparent electrode.

6. The optical information reproduction apparatus as set forth in claim 5, wherein said liquid crystal panel is disposed between said laser generating element and said objective lens in said optical system.

7. An optical information reproduction apparatus for reproducing recorded information from an optical recording medium, comprising:

an optical system, said optical system including:

a laser generating element for generating a laser beam, an objective lens for condensing the laser beam on a recording surface of the optical recording medium, an objective lens transfer means for transferring said objective lens on a focus adjusting orbit, and a photodetector for obtaining a photoelectric conversion signal by applying photoelectric conversion to reflected light from the optical recording medium, a means for generating a reading signal and a tracking error signal, respectively, in accordance with the photoelectric conversion signal, a means for determining a position of said objective lens on the focus adjusting orbit where an amplitude level of a reading signal, among reading signals obtained while said objective lens is being transferred by said objective lens transfer means, reaches a maximum, and the position of the maximum is defined as a first focus adjusting orbit position, a means for determining a position of said objective lens on the focus adjusting orbit where an amplitude level of a tracking error signal, among tracking error signals obtained while said objective lens is being transferred by said objective lens transfer means, reaches a maximum, and the position of the maximum is defined as a second focus adjusting orbit position, a spherical aberration detection means for determining that a spherical aberration is occurring in said optical system when the first focus adjusting orbit position and the second focus adjusting orbit position are different from each other.

8. The optical information reproduction apparatus as set forth in claim 7, wherein said spherical aberration correction means comprises:

a liquid crystal panel provided with an annular transparent electrode formed on a liquid crystal layer filled with liquid crystal that has birefringent characteristics, and a liquid crystal driving circuit for applying a potential that corresponds to the amount of correction to the transparent electrode.

9. The optical information reproduction apparatus as set forth in claim 8, wherein said liquid crystal panel is disposed between said laser generating element and said objective lens in said optical system.

* * * * *